United States Patent
Toyoda

(10) Patent No.: US 10,505,169 B2
(45) Date of Patent: Dec. 10, 2019

(54) POROUS MEMBRANE FOR LITHIUM ION SECONDARY BATTERY AND LITHIUM ION SECONDARY BATTERY

(71) Applicant: ZEON CORPORATION, Chiyoda-ku, Tokyo (JP)

(72) Inventor: Yujiro Toyoda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 38 days.

(21) Appl. No.: 15/324,337

(22) PCT Filed: Jul. 23, 2015

(86) PCT No.: PCT/JP2015/003694
§ 371 (c)(1),
(2) Date: Jan. 6, 2017

(87) PCT Pub. No.: WO2016/013223
PCT Pub. Date: Jan. 28, 2016

(65) Prior Publication Data
US 2017/0250389 A1     Aug. 31, 2017

(30) Foreign Application Priority Data
Jul. 25, 2014   (JP) ................ 2014-152017

(51) Int. Cl.
| | |
|---|---|
| *H01M 10/0525* | (2010.01) |
| *H01M 2/16* | (2006.01) |
| *H01M 4/525* | (2010.01) |
| *H01M 4/02* | (2006.01) |

(52) U.S. Cl.
CPC ......... *H01M 2/1673* (2013.01); *H01M 2/166* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 2011/0159362 A1 | 6/2011 | Wakizaki et al. |
| 2013/0266873 A1 | 10/2013 | Ishii et al. |
| 2015/0140402 A1* | 5/2015 | Kim ............... H01M 2/162 |
| | | 429/144 |

FOREIGN PATENT DOCUMENTS

| | | | |
|---|---|---|---|
| CN | 103283061 A | 9/2013 | |
| EP | 3203545 A1 | 8/2017 | |
| JP | 2011165430 A | 8/2011 | |
| JP | 2013145763 A | 7/2013 | |
| WO | 2010024328 A1 | 3/2010 | |
| WO | WO-2012057324 A1 * | 5/2012 | .......... H01M 2/1653 |

OTHER PUBLICATIONS

Jan. 31, 2017, International Preliminary Report on Patentability issued in the International Patent Application No. PCT/JP2015/003694.
Nov. 20, 2017, Extended European Search Report issued by the European Patent Office in the corresponding European Patent Application No. 15825182.7.
Oct. 10, 2018, Communication pursuant to Article 94(3) EPC issued by the European Patent Office in the corresponding European Patent Application No. 15825182.7.

* cited by examiner

*Primary Examiner* — Haroon S. Sheikh
(74) *Attorney, Agent, or Firm* — Kenja IP Law PC

(57) ABSTRACT

Provided is a technique for capturing transition metal ions, such as cobalt ions, in a secondary battery that elute into an electrolysis solution from a positive electrode active material. A porous membrane for a lithium ion secondary battery contains non-conductive particles and a particulate polymer. The particulate polymer includes an aliphatic conjugated diene monomer unit in a proportion of greater than 85 mass %. The cobalt concentration in a film of 500 μm in thickness and 12 mm in diameter, formed from the particulate polymer, after the film is immersed in a specific cobalt chloride solution for 5 days at 25° C. is at least 300 mass ppm.

7 Claims, No Drawings

POROUS MEMBRANE FOR LITHIUM ION SECONDARY BATTERY AND LITHIUM ION SECONDARY BATTERY

TECHNICAL FIELD

The present disclosure relates to a porous membrane for a lithium ion secondary battery and to a lithium ion secondary battery.

BACKGROUND

Lithium ion secondary batteries have characteristics such as compact size, light weight, high energy-density, and the ability to be repeatedly charged and discharged, and are used in a wide variety of applications. A lithium ion secondary battery generally includes battery components such as a positive electrode, a negative electrode, and a separator that isolates the positive electrode and the negative electrode from one another and prevents short circuiting between the positive and negative electrodes.

In recent years, battery components provided with a porous membrane containing non-conductive particles and a binding material have been used in lithium ion secondary batteries as battery components having improved heat resistance and strength. Specific examples of such battery components include an electrode obtained by forming a porous membrane on an electrode mixed material layer that is provided on a current collector, a separator obtained by forming a porous membrane on a separator substrate, and a separator composed solely by a porous membrane. In order to further improve the performance of lithium ion secondary batteries in which porous membrane-containing battery components such as described above are used, much activity is being focused toward the improvement of porous membranes (for example, refer to PTL 1 and 2).

In one specific example, PTL 1 proposes a technique for improving binding of a porous membrane while inhibiting aggregation of a binding material by using, as the binding material, a carboxy-modified diene-based polymer including from 5 mass % to 85 mass % of an aliphatic conjugated diene monomer unit.

In another example, PTL 2 proposes a technique for improving flexibility of a porous membrane and cycle characteristics of a secondary battery by using a styrene resin and a polymer having a glass transition temperature of no higher than 15° C. as a binding material.

CITATION LIST

Patent Literature

PTL 1: JP 2011-165430 A
PTL 2: WO 2010/024328 A1

SUMMARY

Technical Problem

In recent years, a positive electrode mixed material layer containing a transition metal-containing positive electrode active material (for example, $LiCoO_2$) may be used as an electrode mixed material layer (positive electrode mixed material layer) of a positive electrode in a lithium ion secondary battery for reasons such as increasing battery capacity. However, in a lithium ion secondary battery in which a transition metal-containing positive electrode active material is used, a side-reaction or the like accompanying use of the lithium ion secondary battery may cause the transition metal in the positive electrode active material (for example, cobalt in the case of $LiCoO_2$) to elute into an electrolysis solution in the form of transition metal ions. Moreover, the transition metal that elutes into the electrolysis solution from the positive electrode may deposit on a negative electrode, leading to deterioration of secondary battery life characteristics, such as expansion resistance and cycle characteristics.

With regards to conventional lithium ion secondary batteries, although there has been much attention focused on techniques for improving secondary battery performance by improving physical properties of porous membranes and other battery components themselves, there has been insufficient investigation into the problem of transition metal elution described above. Consequently, there is demand for the provision of a technique that with respect to a lithium ion secondary battery in which a transition metal-containing positive electrode active material is used, enables the capture of transition metal ions, such as cobalt ions, in the secondary battery that have eluted from the positive electrode active material, before these transition metal ions migrate into proximity of the negative electrode, and prevents transition metal deposition on the negative electrode.

Accordingly, an objective of the present disclosure is to provide a lithium ion secondary battery having excellent life characteristics, such as expansion resistance and cycle characteristics, by providing a technique for capturing transition metal ions, such as cobalt ions, in a secondary battery that elute into an electrolysis solution from a positive electrode active material.

Solution to Problem

The inventor carried out diligent investigation with the aim of solving the problems described above. The inventor conceived an idea of providing a porous membrane of a battery component with transition metal capturing functionality in order to capture transition metal ions, such as cobalt ions, in a secondary battery that elute into an electrolysis solution from a positive electrode active material of a positive electrode mixed material layer. The inventor conducted further investigation and discovered that a porous membrane can be provided with extremely high transition metal ion capturing ability by using, as a binding material of the porous membrane, which has conventionally been improved and selected in consideration of binding capacity and flexibility, a particulate polymer that includes an aliphatic conjugated diene monomer unit in a specific proportion and that has specific properties. This discovery led to the present disclosure.

Specifically, the present disclosure aims to advantageously solve the problems described above by disclosing a porous membrane for a lithium ion secondary battery comprising non-conductive particles and a particulate polymer, wherein the particulate polymer includes an aliphatic conjugated diene monomer unit in a proportion of greater than 85 mass %, and a cobalt concentration in a film of 500 μm in thickness and 12 mm in diameter, formed from the particulate polymer, after the film is immersed in a cobalt chloride ($CoCl_2$) solution for 5 days at 25° C. (hereinafter, also referred to as "transition metal capturing ability") is at least 300 mass ppm. The cobalt chloride ($CoCl_2$) solution is defined as a solution having a cobalt concentration of 18 mass ppm in which a mixture of ethyl methyl carbonate and ethylene carbonate with an ethyl methyl carbonate:ethylene carbonate mass ratio of 70:30 is used as a solvent. Through use of the particulate polymer including an aliphatic conjugated diene monomer unit in a specific proportion and having a specific transition metal capturing ability as described above, it is possible to obtain a porous membrane for a lithium ion secondary battery that has excellent capturing ability with respect to transition metal ions that elute from a positive electrode active material.

The "cobalt concentration in a film" referred to in the present disclosure can be measured using an inductively coupled plasma (ICP) mass spectrometer.

In the presently disclosed porous membrane for a lithium ion secondary battery, the particulate polymer preferably includes an acid group-containing monomer unit in a proportion of at least 0.1 mass % and less than 15 mass %. As a result of the particulate polymer including the acid group-containing monomer unit in a proportion that is in the aforementioned range, shape stability of the particulate polymer can be sufficiently improved and transition metal capturing ability of the porous membrane can be further improved.

In the presently disclosed porous membrane for a lithium ion secondary battery, a proportion of trans-1,4 bonding in the aliphatic conjugated diene monomer unit of the particulate polymer is preferably at least 50 mol % and no greater than 80 mol %. As a result of the proportion of trans-1,4 bonding in the aliphatic conjugated diene monomer unit being in the aforementioned range, the particulate polymer can be obtained through easier polymerization conditions, flexibility of the porous membrane can be improved, and transition metal capturing ability of the porous membrane can be further improved.

The "proportion of trans-1,4 bonding in the aliphatic conjugated diene monomer unit of the particulate polymer" referred to in the present disclosure is defined as the proportion of trans-1,4 bonded units among all aliphatic conjugated diene monomer units that are present in the particulate polymer. The same definition applies to cis-1,4 bonding and vinyl bonding described further below.

In the presently disclosed porous membrane for a lithium ion secondary battery, the particulate polymer preferably has a volume average particle diameter D50 of at least 250 nm and no greater than 400 nm. As a result of the particulate polymer having a volume average particle diameter D50 in the aforementioned range, deterioration of lithium ion permeability of the porous membrane and deterioration of life characteristics and rate characteristics of a lithium ion secondary battery including the porous membrane can be inhibited, and transition metal capturing ability and heat contraction resistance of the porous membrane can be sufficiently improved.

The "volume average particle diameter D50" of the particulate polymer referred to in the present disclosure represents a particle diameter at which, in a particle size distribution (volume basis) measured by laser diffraction, the cumulative volume calculated from a small diameter end of the distribution reaches 50%.

The presently disclosed porous membrane for a lithium ion secondary battery described above has excellent transition metal capturing ability and has a maximum cobalt capture amount of, for example, at least 500 mass ppm and no greater than 3,000 mass ppm.

The "maximum cobalt capture amount" referred to in the present disclosure is a value calculated by subtracting the cobalt concentration in the porous membrane prior to a high-temperature cycle test from the cobalt concentration in the porous membrane after the high-temperature cycle test has been carried out. The high-temperature cycle test can be carried out as described in the EXAMPLES section of the present specification.

Moreover, the present disclosure aims to advantageously solve the problems described above by disclosing a lithium ion secondary battery comprising: a positive electrode mixed material layer including a transition metal-containing positive electrode active material; and the porous membrane for a lithium ion secondary battery described above. Through use of the porous membrane for a lithium ion secondary battery described above, it is possible to capture transition metal ions in the secondary battery that elute into an electrolysis solution from the positive electrode active material and to thereby provide a lithium ion secondary battery having excellent life characteristics, such as expansion resistance and cycle characteristics.

In the presently disclosed lithium ion secondary battery, the particulate polymer is preferably contained in a proportion of at least 0.05 parts by mass and no greater than 2 parts by mass relative to 100 parts by mass of the positive electrode active material. As a result of the particulate polymer being contained in a proportion of at least 0.05 parts by mass relative to 100 parts by mass of the positive electrode active material, transition metal ions that elute into an electrolysis solution from the positive electrode active material can be sufficiently captured in the secondary battery. Conversely, as a result of the particulate polymer being contained in a proportion of no greater than 2 parts by mass relative to 100 parts by mass of the positive electrode active material, an increase in internal resistance of the secondary battery can be suppressed.

Advantageous Effect

According to the present disclosure, it is possible to provide a porous membrane for a lithium ion secondary battery that has excellent capturing ability with respect to transition metal ions originating from a positive electrode active material. Moreover, according to the present disclosure, it is possible to provide a lithium ion secondary battery having excellent life characteristics, such as expansion resistance and cycle characteristics.

DETAILED DESCRIPTION (Porous Membrane for Lithium Ion Secondary Battery)

The presently disclosed porous membrane for a lithium ion secondary battery contains non-conductive particles and a specific particulate polymer, and may contain other optional components. The presently disclosed porous membrane for a lithium ion secondary battery can be used as a component in production of the presently disclosed lithium ion secondary battery. Specifically, the presently disclosed porous membrane for a lithium ion secondary battery may be formed on a separator substrate so as to constitute part of a separator, may be used by itself as a separator, or may be formed on an electrode mixed material layer provided on a current collector so as to constitute part of an electrode.

As a result of the specific particulate polymer being used in the presently disclosed porous membrane for a lithium ion secondary battery, the porous membrane can favorably capture transition metal ions in a secondary battery.

<Particulate Polymer>

The particulate polymer is normally a polymer that is not water-soluble, that is present in the form of particles in a dispersion medium such as water, and that maintains its particulate form when contained in the porous membrane.

The particulate polymer is required to include an aliphatic conjugated diene monomer unit in a proportion of greater than 85 mass % and no greater than 100 mass %, and may optionally include an acid group-containing monomer unit and other monomer units. Additionally, the particulate polymer is required to have a specific transition metal capturing ability.

Note that one particulate polymer may be used individually, or two or more particulate polymers may be used in combination.

The phrase "includes a monomer unit" used in the present disclosure means that "a polymer obtained with the monomer includes a structural unit derived from the monomer".

[Aliphatic Conjugated Diene Monomer Unit]

Examples of aliphatic conjugated diene monomers that can be used to form the aliphatic conjugated diene monomer unit include 1,3-butadiene, 2-methyl-1,3-butadiene (isoprene), 2,3-dimethyl-1,3-butadiene, 2-chloro-1,3-butadiene (chloroprene), substituted linear conjugated pentadienes, and substituted and side-chain conjugated hexadienes. Of these monomers, 1,3-butadiene is preferable as an aliphatic conjugated diene monomer from a viewpoint of effectively increasing transition metal ion capturing ability of the porous membrane in which the particulate polymer is contained.

One of such aliphatic conjugated diene monomers may be used individually, or two or more of such aliphatic conjugated diene monomers may be used in combination.

The proportion of the aliphatic conjugated diene monomer unit in the particulate polymer is required to be greater than 85 mass % and no greater than 100 mass %, is preferably at least 90 mass %, and more preferably at least 95 mass %, and is preferably no greater than 99 mass %. If the proportion of the aliphatic conjugated diene monomer unit is not greater than 85 mass %, it is not possible to obtain a porous membrane having sufficient transition metal ion capturing ability.

[[Proportion of Trans-1,4 Bonding]]

An aliphatic conjugated diene monomer can normally at least form cis-1,4 bonded, trans-1,4 bonded, and vinyl bonded monomer units through a polymerization reaction. For example, 1,3-butadiene can normally form cis-1,4 bonded, trans-1,4 bonded, and 1,2 bonded (vinyl bonded) monomer units through a polymerization reaction and isoprene can normally form cis-1,4 bonded and trans-1,4 bonded monomer units, and 1,2 bonded and 3,4 bonded (vinyl bonded) monomer units through a polymerization reaction.

In the aliphatic conjugated diene monomer unit of the particulate polymer, the proportion of trans-1,4 bonding is preferably at least 50 mol %, more preferably at least 55 mol %, and even more preferably at least 58 mol %, and is preferably no greater than 80 mol %, more preferably no greater than 75 mol %, and particularly preferably no greater than 71 mol %. As a result of the proportion of trans-1,4 bonding in the aliphatic conjugated diene monomer unit of the particulate polymer being at least the lower limit of any of the aforementioned ranges, transition metal ion capturing ability of the porous membrane can be further improved. Moreover, as a result of the proportion of trans-1,4 bonding in the aliphatic conjugated diene monomer unit of the particulate polymer being no greater than the upper limit of any of the aforementioned ranges, the particulate polymer can be obtained through easier polymerization conditions and flexibility of the porous membrane can be improved.

[[Proportion of Cis-1,4 Bonding]]

From a viewpoint of improving transition metal ion capturing ability of the porous membrane while maintaining flexibility of the porous membrane, the proportion of cis-1,4 bonding in the aliphatic conjugated diene monomer unit of the particulate polymer is preferably at least 5 mol %, more preferably at least 7 mol %, and particularly preferably at least 10 mol %, and is preferably no greater than 50 mol %, more preferably no greater than 40 mol %, and particularly preferably no greater than 30 mol %.

[[Proportion of Vinyl Bonding]]

From a viewpoint of ensuring flexibility of the porous membrane, the proportion of vinyl bonding in the aliphatic conjugated diene monomer unit of the particulate polymer is preferably at least 5 mol %, more preferably at least 10 mol %, and particularly preferably at least 15 mol %, and is preferably no greater than 50 mol %, more preferably no greater than 30 mol %, and particularly preferably no greater than 20 mol %.

The proportion of each type of bonding in the aliphatic conjugated diene monomer unit of the particulate polymer can be adjusted by adjusting the polymerization conditions. Moreover, the proportion of each type of bonding in the aliphatic conjugated diene monomer unit of the particulate polymer can be determined in accordance with the IR method of JIS K6239.

[Acid Group-Containing Monomer Unit]

Examples of acid group-containing monomers that can be used to form the acid group-containing monomer unit include carboxylic acid group-containing unsaturated monomers, sulfonate group-containing unsaturated monomers, phosphate group-containing unsaturated monomers, and hydroxy group-containing unsaturated monomers.

One of such acid group-containing monomers may be used individually, or two or more of such acid group-containing monomers may be used in combination.

Examples of carboxylic acid group-containing unsaturated monomers include ethylenically unsaturated monocarboxylic acids and derivatives thereof, ethylenically unsaturated dicarboxylic acids and derivatives thereof, and acid anhydrides of ethylenically unsaturated dicarboxylic acids and derivatives thereof.

Examples of ethylenically unsaturated monocarboxylic acids include (meth)acrylic acid and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, acrylic acid anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleates.

In the present disclosure, "(meth)acryl" is used to indicate "acryl" and/or "methacryl".

Examples of sulfonate group-containing unsaturated monomers include vinyl sulfonic acid, methyl vinyl sulfonic acid, (meth)allyl sulfonic acid, 2-sulfoethyl (meth)acrylate, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing unsaturated monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing unsaturated monomers include 2-hydroxyethyl acrylate, 2-hydroxypropyl acrylate, 2-hydroxyethyl methacrylate, and 2-hydroxypropyl methacrylate.

Of these monomers, a carboxylic acid group-containing unsaturated monomer is preferable, an ethylenically unsaturated monocarboxylic acid is more preferable, and (meth) acrylic acid is particularly preferable as an acid group-containing monomer from a viewpoint of increasing shape stability of the particulate polymer.

The proportion of the acid group-containing monomer unit in the particulate polymer is preferably at least 0.1 mass %, more preferably at least 0.5 mass %, and particularly preferably at least 1 mass %, and is required to be less than 15 mass %, is preferably no greater than 10 mass %, and is more preferably no greater than 5 mass %. As a result of the proportion of the acid group-containing monomer unit in the particulate polymer being at least 0.1 mass %, shape stability of the particulate polymer can be sufficiently improved. Moreover, as a result of the proportion of the acid group-containing monomer unit in the particulate polymer being less than 15 mass %, transition metal ion capturing ability of the porous membrane can be improved through the presence of the aliphatic conjugated diene monomer unit.

[Other Monomer Units]

The particulate polymer may further include other monomer units besides the aliphatic conjugated diene monomer unit and the acid group-containing monomer unit described above. Examples of these other monomer units include an aromatic vinyl monomer unit and a nitrile group-containing monomer unit.

[[Aromatic Vinyl Monomer Unit]]

Examples of aromatic vinyl monomers that can be used to form the aromatic vinyl monomer unit include styrene, α-methylstyrene, vinyltoluene, and divinyl benzene. Of these monomers, styrene is preferable as an aromatic vinyl monomer. One of such aromatic vinyl monomers may be used individually, or two or more of such aromatic vinyl monomers may be used in combination.

[[Nitrile Group-Containing Monomer Unit]]

Examples of nitrile group-containing monomers that can be used to form the nitrile group-containing monomer unit include α,β-ethylenically unsaturated nitrile monomers. No specific limitations are placed on α,β-ethylenically unsaturated nitrile monomers that can be used other than being an α,β-ethylenically unsaturated compound that contains a nitrile group. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer. One of such nitrile group-containing monomers may be used individually, or two or more of such nitrile group-containing monomers may be used in combination.

The proportion of such other monomer units in the particulate polymer is required to be less than 15 mass %. As a result of the proportion of the other monomer units in the particulate polymer being less than 15 mass %, transition metal ion capturing ability of the porous membrane can be improved through the presence of the aliphatic conjugated diene monomer unit.

[Compounding Ratio of Particulate Polymer Relative to Non-Conductive Particles]

Although no specific limitations are placed on the compounding ratio of the particulate polymer relative to the non-conductive particles in the porous membrane for a lithium ion secondary battery, the amount of the particulate polymer that is compounded relative to 100 parts by mass of the non-conductive particles is preferably at least 1 part by mass, more preferably at least 2 parts by mass, and even more preferably at least 3 parts by mass, and is preferably no greater than 25 parts by mass, more preferably no greater than 15 parts by mass, and even more preferably no greater than 10 parts by mass. As a result of the amount of the particulate polymer that is compounded relative to 100 parts by mass of the non-conductive particles being at least the lower limit of any of the aforementioned ranges, deterioration of expansion resistance and high-temperature cycle characteristics of a secondary battery can be effectively inhibited through adhesion between the non-conductive particles themselves and between the non-conductive particles and a substrate. Moreover, as a result of the amount of the particulate polymer that is compounded relative to 100 parts by mass of the non-conductive particles being no greater than the upper limit of any of the aforementioned ranges, deterioration of lithium ion permeability and deterioration of rate characteristics of a secondary battery can be inhibited, and a decrease in heat contraction resistance can be suppressed.

[Production of Particulate Polymer]

The particulate polymer is produced through polymerization of a monomer composition that contains the monomers described above. The proportion of each monomer in the monomer composition is normally the same as the proportion of the corresponding monomer unit in the target particulate polymer.

No specific limitations are placed on the mode of polymerization of the particulate polymer. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used aids such as emulsifiers, dispersants, polymerization initiators, inorganic electrolytes, and the like may be used in the polymerization in an amount that is also the same as commonly used.

Although no specific limitations are placed on the temperature at which polymerization of the particulate polymer is carried out, from a viewpoint of obtaining a proportion of trans-1,4 bonding in the aliphatic conjugated diene monomer unit that is within any of the aforementioned ranges, the temperature is preferably no higher than 80° C., and more preferably no higher than 70° C., and from a viewpoint of ease of carrying out the polymerization reaction, the temperature is preferably at least −10° C., and more preferably at least 0° C.

<Properties of Particulate Polymer>

The particulate polymer produced by the method described above preferably has the following properties.

[Degree of Swelling in Electrolysis Solution]

The "degree of swelling in electrolysis solution" of the particulate polymer in the present disclosure can be obtained as a value (factor) calculated by dividing the weight of a film obtained by casting the particulate polymer (cast film) after the cast film has been immersed in a specific electrolysis solution under specific conditions by the weight of the cast film prior to immersion in the electrolysis solution. More specifically, the cast film is obtained by the method described in the EXAMPLES section of the present specification and measurement thereof is carried out by the measurement method also described in the EXAMPLES section.

The degree of swelling in electrolysis solution of the particulate polymer is preferably greater than a factor of 1 and no greater than a factor of 2.5, more preferably no greater than a factor of 2.0, and particularly preferably no greater than a factor of 1.5. As a result of the degree of swelling in electrolysis solution of the particulate polymer being no greater than a factor of 2.5, elution of the particulate polymer into an electrolysis solution can be inhibited and durability of the porous membrane in an electrolysis solution can be ensured. Conversely, as a result of the degree of swelling in electrolysis solution of the particulate polymer being at least a factor of 1, lithium ion permeability in a secondary battery can be ensured and transition metal ions that elute into an electrolysis solution can be effectively captured.

The degree of swelling in electrolysis solution of the particulate polymer can be adjusted by altering the types and amounts of monomers that are used. For example, the degree of swelling in electrolysis solution may be adjusted by increasing the proportion of an aromatic vinyl monomer unit such as styrene, or by adopting a higher polymerization temperature or a longer polymerization reaction time in order to increase the polymerization molecular weight.

[Volume Average Particle Diameter D50]

The volume average particle diameter D50 of the particulate polymer is preferably at least 100 nm, more preferably at least 150 nm, even more preferably at least 250 nm, and particularly preferably at least 260 nm, and is preferably no greater than 700 nm, more preferably no greater than 500 nm, even more preferably no greater than 400 nm, and particularly preferably no greater than 360 nm. As a result of the volume average particle diameter D50 of the particulate polymer being at least the lower limit of any of the aforementioned ranges, deterioration of lithium ion permeability of the porous membrane and deterioration of life characteristics and rate characteristics of a lithium ion secondary battery including the porous membrane can be inhibited. Moreover, as a result of the volume average particle diameter D50 of the particulate polymer being no greater than the upper limit of any of the aforementioned ranges, transition metal ion capturing ability and heat contraction resistance of the porous membrane can be sufficiently improved.

The volume average particle diameter D50 of the particulate polymer can be adjusted by altering the production conditions of the particulate polymer. Specifically, the volume average particle diameter D50 of the particulate polymer may be adjusted by, for example, appropriately altering the type and amount of an aid, such as an emulsifier, a dispersant, an inorganic electrolyte, or the like, that is used in polymerization.

[Transition Metal Capturing Ability]

As previously explained, the "transition metal capturing ability" of the particulate polymer in the present disclosure is defined as "the cobalt concentration (mass ppm) of a film of 500 μm in thickness and 12 mm in diameter, formed from the particulate polymer, after the film is immersed in a cobalt chloride ($CoCl_2$) solution for 5 days at 25° C.". Furthermore, as previously explained, the "cobalt chloride ($CoCl_2$) solution" is defined as a solution having a cobalt concentration of 18 mass ppm in which a mixture of ethyl methyl carbonate and ethylene carbonate (ethyl methyl carbonate:ethylene carbonate=70:30 (mass ratio)) is used as a solvent.

The film of 500 μm in thickness and 12 mm in diameter can be prepared by pouring an aqueous solution of the particulate polymer into a petri dish or other flat-bottomed container such as to have a thickness of 500 μm after drying, drying the aqueous solution of the particulate polymer for 5 days at 25° C., and subsequently cutting out a film of 12 mm in diameter from the dried product. The cobalt chloride solution can be prepared by mixing the aforementioned solvent and cobalt chloride by a known method. Although no specific limitations are placed on the amount of the cobalt chloride solution in which the film is immersed, the amount of the cobalt chloride solution is typically 10 g.

Herein, the "transition metal capturing ability of the particulate polymer" is an index obtained by evaluating capturing ability with respect to transition metal ions using cobalt as a representative example of a transition metal. The magnitude of transition metal capturing ability determined for the particulate polymer using cobalt normally correlates with the magnitude of transition metal capturing ability of the particulate polymer with respect to other transition metals. In other words, a particulate polymer having high transition metal capturing ability determined using cobalt also has relatively high capturing ability with respect to other transition metals (for example, nickel and manganese), and a particulate polymer having low transition metal capturing ability determined using cobalt has relatively low capturing ability with respect to other transition metals.

The transition metal capturing ability of the particulate polymer is required to be at least 300 mass ppm. Moreover, the transition metal capturing ability of the particulate polymer is preferably at least 400 mass ppm, more preferably at least 450 mass ppm, and particularly preferably at least 490 mass ppm. If the transition metal capturing ability of the particulate polymer is less than 300 mass ppm, the porous membrane containing the particulate polymer is not capable of sufficiently capturing transition metal ions, and a secondary battery cannot be provided with excellent life characteristics, such as expansion resistance and cycle characteristics. Although the transition metal capturing ability of the particulate polymer is preferably as high as possible, the transition metal capturing ability is normally no greater than 1,000 mass ppm from a viewpoint of polymerizability of the particulate polymer.

The transition metal capturing ability of the particulate polymer can be adjusted by altering the types and amounts of monomers that are used, and also by altering the polymerization conditions. For example, the transition metal capturing ability of the particulate polymer may be adjusted by appropriately adjusting various factors that influence transition metal capturing ability such as increasing the proportion of the aliphatic conjugated diene monomer unit, such as 1,3-butadiene, in the particulate polymer, lowering the polymerization temperature to increase the proportion of trans-1,4 bonding in the aliphatic conjugated diene monomer unit of the particulate polymer, increasing the degree of swelling in electrolysis solution of the particulate polymer, or lengthening the polymerization reaction time to increase the molecular weight of the particulate polymer.

<Non-Conductive Particles>

The non-conductive particles are particles that are non-conductive and that maintain their shape without dissolving in a dispersion medium such as water or an electrolysis solution of a secondary battery. The non-conductive particles are electrochemically stable and, as a result, are present stably within the porous membrane in a usage environment of a secondary battery. Through use of the non-conductive particles in the porous membrane, a net-like structure of the porous membrane can be blocked to an appropriate degree such that lithium dendrites and the like are prevented from passing through the porous membrane, and the porous membrane can be provided with sufficient strength and heat resistance. Various types of inorganic particles and organic particles can be used as the non-conductive particles.

Examples of inorganic particles that can be used include particles of oxides such as aluminum oxide (alumina), hydrous aluminum oxide (Boehmite), silicon oxide, magnesium oxide, titanium oxide, $BaTiO_2$, ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary.

Examples of organic particles that can be used include particles of various crosslinked polymers such as polyethylene, polystyrene, polydivinyl benzene, crosslinked styrene-divinyl benzene copolymer, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide.

One type of non-conductive particles may be used individually, or two or more types of non-conductive particles may be used in combination.

Of the above examples, inorganic particles are preferable, aluminum oxide (alumina), hydrous aluminum oxide (Boehmite), and barium sulfate are more preferable, and aluminum oxide (alumina) and barium sulfate are even more preferable as the non-conductive particles from a viewpoint of improving durability of the porous membrane and battery characteristics of a secondary battery that includes the porous membrane.

The volume average particle diameter D50 of the non-conductive particles is preferably at least 0.01 μm, more preferably at least 0.1 μm, and even more preferably at least 0.2 μm, and is preferably no greater than 5 μm, more preferably no greater than 3 μm, and even more preferably no greater than 1 μm. Use of non-conductive particles having a volume average particle diameter D50 such as described above enables an appropriate packing rate of the non-conductive particles in the resultant porous membrane and can ensure heat contraction resistance of the porous membrane.

The "volume average particle diameter D50" of the non-conductive particles represents a particle diameter at which, in a particle size distribution (volume basis) measured by laser diffraction, the cumulative volume calculated from a small diameter end of the distribution reaches 50%.

The specific surface area of the non-conductive particles is preferably at least 1.0 $m^2/g$, more preferably at least 2.0 $m^2/g$, and even more preferably at least 3.0 $m^2/g$, and is preferably no greater than 10 $m^2/g$, more preferably no greater than 7.5 $m^2/g$, and even more preferably no greater than 6.3 $m^2/g$. Use of non-conductive particles having a specific surface area that is at least the lower limit of any of the aforementioned ranges enables an appropriate packing rate of the non-conductive particles in the resultant porous membrane and can inhibit reduction of heat contraction resistance of the porous membrane. Conversely, use of non-conductive particles having a specific surface area that is no greater than the upper limit of any of the aforementioned ranges can inhibit deterioration of battery characteristics of a secondary battery caused by an increase in moisture content of the porous membrane.

The term "specific surface area" refers to a nitrogen adsorption specific surface area that is measured by the BET method.

<Other Components>

Examples of other components besides the particulate polymer and the non-conductive particles that may be contained in the porous membrane include known additives such as dispersants, viscosity modifiers, wetting agents, and additives for electrolysis solution. Moreover, in addition to the particulate polymer having the transition metal adsorbing ability described above, the porous membrane may contain a particulate polymer (other particulate polymer) that does not have the transition metal adsorbing ability described above as a binding material. Commonly known examples of such other components can be used without any specific limitations so long as they do not affect the battery reactions. One of such additives may be used individually, or two or more of such additives may be used in combination in a freely selected ratio.

[Dispersants]

Known dispersants may be used without any specific limitations. However, a water-soluble polymer including an acidic group-containing monomer unit, or an ammonium salt or alkali metal salt thereof, is preferable as a dispersant. The acidic group-containing monomer unit is a structural unit formed through polymerization of an acidic group-containing monomer. Moreover, the acidic group-containing monomer is a monomer that contains an acidic group. When a polymer is referred to as "water-soluble" in the present disclosure, this means that when 0.5 g of the polymer is dissolved in 100 g of water at 25° C., insoluble content in less than 0.5 mass %.

Examples of acidic group-containing monomers that can be used include carboxylic acid group-containing monomers, sulfonate group-containing monomers, and phosphate group-containing monomers.

[Viscosity Modifier]

Known viscosity modifiers may be used without any specific limitations. However, a water-soluble polymer such as carboxymethyl cellulose, a salt thereof, or polyacrylamide is preferable as a viscosity modifier from a viewpoint of increasing heat contraction resistance of the porous membrane.

The amount of the viscosity modifier that is compounded per 100 parts by mass of the non-conductive particles is preferably at least 0.1 parts by mass, more preferably at least 0.5 parts by mass, and even more preferably at least 1 part by mass, and is preferably no greater than 10 parts by mass, more preferably no greater than 3 parts by mass, and even more preferably no greater than 2 parts by mass.

[Wetting Agent]

Known wetting agents can be used without any specific limitations. However, non-ionic surfactants and anionic surfactants are preferable, and non-ionic surfactants such as ethylene oxide-propylene oxide copolymer are more preferable as a wetting agent from a viewpoint of facilitating application of a composition for the porous membrane onto a substrate with an appropriate thickness.

The amount of the wetting agent that is compounded per 100 parts by mass of the non-conductive particles is preferably at least 0.05 parts by mass, more preferably at least 0.1 parts by mass, and even more preferably at least 0.15 parts by mass, and is preferably no greater than 2 parts by mass, more preferably no greater than 1.5 parts by mass, and even more preferably no greater than 1 part by mass.

<Formation of Porous Membrane for Lithium Ion Secondary Battery>

The porous membrane containing the components described above can be formed using a slurry composition for a porous membrane obtained by dissolving or dispersing the components in a hydrophilic solvent such as water that is used as a dispersion medium. Specifically, the porous membrane can be formed, for example, by applying the aforementioned slurry composition for a porous membrane onto a suitable substrate to form an applied film and then drying the applied film. The resultant porous membrane has excellent capturing ability with respect to a constituent transition metal of a positive electrode active material. Consequently, even when a positive electrode mixed material layer containing a transition metal-containing positive electrode active material, such as $LiCoO_2$, is used in a secondary battery that includes the porous membrane, transition metal ions, such as cobalt ions, that elute into an electrolysis solution from the positive electrode active material can be favorably captured by the porous membrane. As a result, deposition of the transition metal ions on a negative electrode can be inhibited and the secondary battery can exhibit excellent life characteristics.

[Production of Slurry Composition for Porous Membrane]

The slurry composition for a porous membrane can be produced as described above by dissolving or dispersing the components in a hydrophilic solvent such as water that is used as a dispersion medium. Specifically, the slurry composition for a porous membrane can be produced by mixing the components and the hydrophilic solvent using a mixer such as a ball mill, a sand mill, a bead mill, a pigment disperser, a grinding machine, an ultrasonic disperser, a homogenizer, a planetary mixer, or a FILMIX.

—Hydrophilic Solvent—

Examples of hydrophilic solvents that can be used include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tert-butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Note that water may be used as a main solvent and other hydrophilic solvents besides water may be mixed therewith to the extent that a dissolved or dispersed state of the components can be ensured.

[Substrate]

No specific limitations are placed on the substrate onto which the slurry composition for a porous membrane is applied. For example, in a situation in which the porous membrane is used by itself as a separator, the substrate may be a detachable substrate. In a situation in which a detachable substrate is used as the substrate, a porous membrane that can be used as a separator is obtained as a free-standing film by forming an applied film of the slurry composition for a porous membrane on the surface of the detachable substrate, drying the applied film to form the porous membrane, and peeling the porous membrane from the detachable substrate. The resultant free-standing film can be suitably used as a separator having a function of capturing transition metal ions that elute into an electrolysis solution from a positive electrode active material.

On the other hand, in a situation in which the porous membrane is used as a component that constitutes part of a separator, a separator substrate can be used as a substrate, and in a situation in which the porous membrane is used as a component that constitutes part of an electrode, an electrode substrate obtained by forming an electrode mixed material layer on a current collector can be used as a substrate. In these situations, a separator or an electrode including the porous membrane can be easily produced by forming an applied film of the slurry composition for a porous membrane on the surface of the separator substrate or the electrode substrate and then drying the applied film to form the porous membrane. The porous membrane that is provided on the separator substrate or the electrode substrate can be suitably used as a layer having a protective function of improving heat resistance and strength of the separator substrate or the electrode substrate and a function of capturing transition metal ions that elute into an electrolysis solution from a positive electrode active material.

The porous membrane is preferably located between a positive electrode and a negative electrode in order to reliably capture transition metal ions that elute from a positive electrode active material of a positive electrode mixed material layer, before these transition metal ions come within proximity of the negative electrode; in other words, the porous membrane is preferably provided on a separator substrate such as to constitute part of a separator.

—Separator Substrate—

The separator substrate on which the porous membrane may be formed is not specifically limited and may be a known separator substrate such as an organic separator. The organic separator is a porous member formed from an organic material and examples thereof include non-woven fabric and fine porous membranes containing a polyolefin resin such as polyethylene or polypropylene, an aromatic polyamide resin, or the like. Of such organic separators, non-woven fabric and fine porous membranes made from polyethylene are preferable due to having excellent strength. Although the thickness of the organic separator can be freely selected, the thickness is normally at least 0.5 μm, and preferably at least 5 μm, and is normally no greater than 40 μm, preferably no greater than 30 μm, and more preferably no greater than 20 μm.

—Electrode Substrate—

The electrode substrate (positive/negative electrode substrate) on which the porous membrane may be formed is not specifically limited and may, for example, be an electrode substrate obtained by forming an electrode mixed material layer on a current collector.

Herein, the current collector, components in the electrode mixed material layer (for example, an electrode active material (positive/negative electrode active material) and a binding material for an electrode mixed material layer (binding material for a positive/negative electrode mixed material layer)), and the method by which the electrode mixed material layer is formed on the current collector may be known examples thereof such as described, for example, in JP 2013-145763 A.

In particular, a transition metal-containing compound such as a transition metal oxide, a transition metal sulfide, or a composite metal oxide of lithium and a transition metal may be used as the positive electrode active material in order to improve battery capacity. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide of lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn($Li(CoMnNi)O_2$), lithium-containing composite oxide of Ni—Mn—Al, lithium-containing composite oxide of Ni—Co—Al, and a solid solution comprising $LiMaO_2$ and $Li_2MbO_3$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal.

Examples of the lithium-containing composite metal oxide with an olivine structure include olivine-type lithium phosphate compounds represented by the formula $Li_yM-dPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0 \leq y \leq 2$. Md of the olivine-type lithium phosphate compounds represented by the formula $Li_yM-dPO_4$ may be partly substituted with another metal. Examples of the metal that may substitute part of Md include Cu, Mg, Zn, V, Ca, Sr, Ba, Ti, Al, Si, B, and Mo.

Of the above examples, a composite metal oxide of lithium and a transition metal is preferable, a lithium-containing composite metal oxide with a layered structure is more preferable, and lithium containing cobalt oxide ($LiCoO_2$) is particularly preferable from a viewpoint of increasing the capacity of a lithium ion secondary battery and also from a viewpoint of output characteristics and high-temperature cycle characteristics of a lithium ion secondary battery.

—Detachable Substrate—

The detachable substrate on which the porous membrane may be formed is not specifically limited and may be a known detachable substrate.

Moreover, the method by which an applied film of the slurry composition for a porous membrane is formed on a substrate is not specifically limited and may be a commonly known method. Specifically, the applied film may be formed by, for example, doctor blading, dip coating, reverse roll coating, direct roll coating, gravure coating, extrusion coating, or brush coating. The thickness of a slurry film on the substrate after application but prior to drying can be set as appropriate in accordance with the thickness of the porous membrane that is to be obtained after drying.

Moreover, the method by which the applied film of the slurry composition for a porous membrane is dried on the substrate is not specifically limited and may be a commonly known method such as drying by warm, hot, or low-humidity air; drying in a vacuum; or drying by irradiation of infrared light or electron beams.

After the slurry composition for a porous membrane has been dried, the resultant porous membrane may be subjected to pressing treatment by mold pressing, roll pressing, or the like. The pressing treatment improves close adherence between the porous membrane and the substrate.

<Properties of Porous Membrane for Lithium Ion Secondary Battery>

The porous membrane formed by the method described above preferably has the following properties.

[Thickness]

The thickness of the porous membrane is preferably at least 0.5 µm, more preferably at least 0.75 µm, and even more preferably at least 1 µm, and is preferably no greater than 10 µm, more preferably no greater than 7 µm, and even more preferably no greater than 5 µm. As a result of the thickness of the porous membrane being at least the lower limit of any of the aforementioned ranges, sufficient strength of the porous membrane can be ensured and a transition metal originating from a positive electrode active material can be more sufficiently captured such that battery characteristics of a secondary battery in which the porous membrane is used can be improved. Moreover, as a result of the thickness of the porous membrane being no greater than the upper limit of any of the aforementioned ranges, diffusivity of an electrolysis solution can be ensured and a secondary battery can be made sufficiently compact.

[Content of Particulate Polymer]

In the porous membrane, the content (mass per unit area) of the particulate polymer having the transition metal capturing ability described above is preferably at least 0.01 $g/m^2$, more preferably at least 0.03 $g/m^2$, even more preferably at least 0.05 $g/m^2$, and particularly preferably at least 0.1 $g/m^2$. Moreover, the content (mass per unit area) of the particulate polymer is preferably no greater than 1.0 $g/m^2$, more preferably no greater than 0.9 $g/m^2$, and even more preferably no greater than 0.8 $g/m^2$. As a result of the content of the particulate polymer in the porous membrane being at least the lower limit of any of the aforementioned ranges, expansion of a secondary battery and accompanying deterioration of high-temperature cycle characteristics thereof can be effectively inhibited through adhesion between the non-conductive particles themselves and between the non-conductive particles and the substrate. Moreover, a transition metal originating from a positive electrode active material can be captured more sufficiently and battery characteristics of a secondary battery in which the porous membrane is used can be improved. Furthermore, as a result of the content of the particulate polymer in the porous membrane being no greater than the upper limit of any of the aforementioned ranges, deterioration of lithium ion permeability of the porous membrane and rate characteristics of a secondary battery can be inhibited.

In the case of a lithium ion secondary battery in which the porous membrane is used, the content of the particulate polymer in the porous membrane per 100 parts by mass of a transition metal-containing positive electrode active material is preferably at least 0.05 parts by mass and no greater than 2 parts by mass. As a result of the content of the particulate polymer in the porous membrane being at least the lower limit of the aforementioned range, expansion of the secondary battery and accompanying deterioration of high-temperature cycle characteristics can be effectively inhibited through strong adhesion between the non-conductive particles themselves and between the non-conductive particles and the substrate. Moreover, a transition metal originating from the positive electrode active material can be more sufficiently captured and battery characteristics of the secondary battery in which the porous membrane is used can be improved. Furthermore, as a result of the content of the particulate polymer in the porous membrane being no greater than the upper limit of the aforementioned range, deterioration of lithium ion permeability of the porous membrane and deterioration of rate characteristics of the secondary battery due to an increase in internal resistance can be inhibited.

[Maximum Cobalt Capture Amount]

From a viewpoint of capturing transition metal ions in a secondary battery that elute into an electrolysis solution from a positive electrode active material and also providing a secondary battery having excellent life characteristics, such as expansion resistance and cycle characteristics, the maximum cobalt capture amount of the porous membrane described above is preferably at least 500 mass ppm, more preferably at least 600 mass ppm, even more preferably at least 700 mass ppm, particularly preferably at least 800 mass ppm, and most preferably at least 990 mass ppm, and is preferably no greater than 3,000 mass ppm.

The maximum cobalt capture amount of the porous membrane is a value calculated by subtracting the cobalt concentration in the porous membrane prior to a high-temperature cycle test from the cobalt concentration in the porous membrane after the high-temperature cycle test has been carried out. The high-temperature cycle test can be carried out as described in the EXAMPLES section of the present specification.

The maximum cobalt capture amount of the porous membrane can be controlled, for example, by adjusting the composition and properties of the particulate polymer that is used and also by adjusting the amount of the particulate polymer that is contained in the porous membrane.

(Lithium Ion Secondary Battery)

The presently disclosed lithium ion secondary battery at least includes: a positive electrode mixed material layer containing a transition metal-containing positive electrode active material; and the porous membrane for a lithium ion secondary battery described above. More specifically, the presently disclosed lithium ion secondary battery includes a positive electrode, a negative electrode, a separator, and an electrolysis solution, and the porous membrane for a lithium ion secondary battery described above is provided between a positive electrode mixed material layer of the positive electrode and a negative electrode mixed material layer of the negative electrode. In the presently disclosed lithium ion secondary battery, the presently disclosed porous membrane can effectively capture transition metal ions that elute into the electrolysis solution from the positive electrode active material such that deposition of these transition metal ions on the negative electrode is inhibited. As a result, the presently disclosed lithium ion secondary battery has excellent life characteristics, such as expansion resistance and cycle characteristics.

<Positive Electrode, Negative Electrode, and Separator>

At least one of the positive electrode, the negative electrode, and the separator used in the presently disclosed lithium ion secondary battery includes a porous membrane. Specifically, an electrode produced by providing a porous membrane on an electrode substrate that is obtained by forming an electrode mixed material layer on a current collector can be used as a porous membrane-containing positive electrode or a porous membrane-containing negative electrode. Moreover, a separator produced by providing a porous membrane on a separator substrate or a separator composed by a porous membrane can be used as a porous membrane-containing separator. The electrode substrate and the separator substrate can be any of the examples previously described in the "Substrate" section.

A positive electrode, negative electrode, or separator that does not include a porous membrane can be used without any specific limitations. For example, an electrode composed of an electrode substrate such as previously described or a separator composed of a separator substrate such as previously described may be used.

It should also be noted that the positive electrode, the negative electrode, and the separator may also include elements other than a porous membrane (for example, an adhesive layer) so long as the effects disclosed herein are not significantly lost as a result.

<Electrolysis Solution>

The electrolysis solution is normally an organic electrolysis solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of suitable organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

Note that the concentration of the electrolyte in the electrolysis solution may be adjusted as appropriate. Moreover, known additives such as vinylene carbonate (VC) may be added to the electrolysis solution.

<Production of Lithium Ion Secondary Battery>

The presently disclosed lithium ion secondary battery is produced, for example, by stacking the positive electrode and the negative electrode with the separator in-between, rolling or folding the resulting stack as necessary in accordance with the battery shape, placing the stack in a battery container, filling the battery container with the electrolysis solution, and sealing the battery container. In order to prevent pressure increase inside the lithium ion secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used in order to measure and evaluate the microstructure, transition metal capturing ability, degree of swelling in electrolysis solution, and volume average particle diameter D50 of a particulate polymer, the slurry stability of a slurry composition for a porous membrane, the lithium ion permeability and heat contraction resistance of a separator, the maximum cobalt capture amount of a porous membrane, and the high-temperature cycle characteristics, rate characteristics, and expansion resistance of a lithium ion secondary battery.

<Microstructure of Particulate Polymer>

The microstructure of a particulate polymer (proportions of trans-1,4 bonding, cis-1,4 bonding, and vinyl bonding) was determined in accordance with the IR method of JIS K6239.

<Transition Metal Capturing Ability of Particulate Polymer>

An aqueous dispersion of a particulate polymer (solid content concentration: 15 mass %) was poured into a Teflon® (Teflon is a registered trademark in Japan, other countries, or both) petri dish and was dried for 5 days at 25° C. The dried product was punched out to a size of 12 mm in diameter to obtain a film of 500 μm in thickness and 12 mm in diameter as a specimen. The weight of the specimen was measured. Next, cobalt chloride (anhydrous) ($CoCl_2$) was dissolved in a solvent (ethyl methyl carbonate:ethylene carbonate=70:30 (mass ratio)) to obtain a cobalt chloride solution having a cobalt concentration of 18 mass ppm (cobalt chloride concentration: 40 mass ppm). Subsequently, 10 g of the cobalt chloride solution described above was placed in a glass container and the specimen was immersed in the cobalt chloride solution and was left for 5 days at 25° C. Thereafter, the specimen was removed from the cobalt chloride solution and was sufficiently washed with diethyl carbonate. The weight of the specimen was measured after sufficiently wiping off diethyl carbonate that was attached to the surface of the specimen. Next, the specimen was placed in a Teflon® beaker, and sulfuric acid and nitric acid (sulfuric acid:nitric acid=0.1:2 (volume ratio)) were added thereto. The contents of the beaker were heated using a hot plate and were concentrated until carbonization of the specimen occurred. Nitric acid and perchloric acid (nitric acid: perchloric acid=2:0.2 (volume ratio)) were added to the beaker, followed by perchloric acid and hydrofluoric acid (perchloric acid:hydrofluoric acid=2:0.2 (volume ratio)), and the contents of the beaker were concentrated until white smoke was given off. Next, nitric acid and ultrapure water (nitric acid:ultrapure water=0.5:10 (volume ratio)) were added to the beaker and the contents thereof were heated. The contents of the beaker were left to cool and were then adjusted to a fixed volume to obtain a fixed volume solution. The amount of cobalt in the fixed volume solution was measured using an ICP mass spectrometer (ELAN DRS II produced by PerkinElmer Inc.). The amount of cobalt in the fixed volume solution was divided by the weight of the specimen to determine the cobalt concentration (mass ppm) in the specimen, and this cobalt concentration was taken to be the transition metal capturing ability. A higher cobalt concentration indicates that the particulate polymer has higher transition metal capturing ability.

<Degree of Swelling in Electrolysis Solution of Particulate Polymer>

An aqueous dispersion of a particulate polymer was poured into a polytetrafluoroethylene petri dish and was dried to obtain a cast film of 1 mm in thickness. The cast film was cut to 2 cm×2 cm in size to obtain a specimen. The weight of the specimen was measured and was taken to be W0. Thereafter, the specimen was immersed in an electrolysis solution having a temperature of 60° C. for 72 hours. The immersed specimen was pulled out of the electrolysis solution, was wiped with a paper towel, and the weight W1 thereof straight after immersion was measured. The degree of swelling in electrolysis solution of the particulate polymer was then determined by calculating W1/W0.

The electrolysis solution was obtained by dissolving $LiPF_6$ as a supporting electrolyte with a concentration of 1 mol/L in a mixed solvent obtained by mixing ethylene carbonate (EC) and diethyl carbonate (DEC) with an EC:DEC ratio of 1:2 (volume ratio at 20° C.).

<Volume Average Particle Diameter D50 of Particulate Polymer>

The volume average particle diameter D50 of a particulate polymer was determined to be a particle diameter at which, in a particle size distribution (volume basis) measured by a laser diffraction particle diameter measurement device (SALD-7100 produced by Shimadzu Corporation) with respect to an aqueous dispersion of the particulate polymer adjusted to a solid content concentration of 15 weight %, the cumulative volume calculated from a small diameter end of the distribution reached 50%.

<Slurry Stability of Slurry Composition for Porous Membrane>

An amount of 200 g of a produced slurry composition for a porous membrane was weighed and was filtered through nylon filter paper having a pore size of 10 μm. Next, the slurry composition was placed in a cup of 130 mm in diameter and 100 mm in height and was stirred for 20 minutes at 3,000 rpm using a disper blade (blade diameter: 60 mm). After the stirring, the slurry composition was filtered through filter paper having a pore size of 5 μm, and the amount of a resultant residue was measured and evaluated by the following standard. A smaller amount of residue indicates that there is a smaller amount of coarse aggregates and that the slurry composition for a porous membrane has better slurry stability.

A: Amount of residue of less than 50 ppm

B: Amount of residue of at least 50 ppm and less than 100 ppm

<Lithium Ion Permeability of Separator>

A Gurley meter (Smooth & Porosity Meter (measurement diameter: φ2.9 cm) produced by Kumagai Riki Kogyo Co., Ltd.) was used to measure a Gurley value (sec/100 cc) with respect to a produced separator (separator obtained by applying a slurry composition for a porous membrane onto a separator substrate and drying the slurry composition thereon) and also with respect to a separator substrate onto which a slurry composition for a porous membrane had not been applied. The Gurley value G0 for the separator substrate and the Gurley value G1 for the porous membrane-containing separator were used to determine a rate of Gurley value increase $\Delta G$ ($=\{(G1-G0)/G0\} \times 100$) (%), which was evaluated by the following standard. A smaller rate of Gurley value increase ΔG indicates that the porous membrane-containing separator has better lithium ion permeability.

A: Rate of Gurley value increase ΔG of less than 15%

B: Rate of Gurley value increase ΔG of at least 15% and less than 25%

C: Rate of Gurley value increase ΔG of at least 25% and less than 35%

<Heat Contraction Resistance of Separator>

A specimen was prepared by cutting a square shape of 12 cm in width by 12 cm in length from a produced separator and drawing a square shape having a side length of 10 cm within the cut square shape. The specimen was left for 1 hour in a 130° C. thermostatic bath and the change in area of the square shape drawn within the specimen (={(area of square shape prior to being left–area of square shape after being left)/area of square shape prior to being left}×100) (%) was determined thereafter as a rate of heat contraction, which was evaluated by the following standard. A smaller rate of heat contraction indicates that the separator including the porous membrane has better heat contraction resistance.

A: Rate of heat contraction of less than 1%

B: Rate of heat contraction of at least 1% and less than 5%

<Maximum Cobalt Capture Amount of Porous Membrane>

The maximum cobalt capture amount of a porous membrane was determined to be a value (mass ppm) calculated by subtracting the cobalt concentration in the porous membrane prior to a high-temperature cycle test from the cobalt concentration in the porous membrane after completion of the high-temperature cycle test. Note that the high-temperature cycle test is described further below. A larger value indicates higher capturing ability with respect to a transition metal originating from a positive electrode active material, which can contribute to improving battery life characteristics and inhibiting gas production.

The cobalt concentration in the porous membrane prior to and after completion of the high-temperature cycle test was determined as described below.

<<Cobalt Concentration in Porous Membrane Prior to High-Temperature Cycle Test>>

First, a separator that was the same as that used in a laminate cell for the high-temperature cycle test was cut out to a size of 3.5 cm×4.5 cm to prepare a separator specimen A. Next, a separator substrate that was the same as that used in the separator was cut out to a size of 3.5 cm×4.5 cm to prepare a separator substrate specimen A'.

The weight of a porous membrane included in the separator specimen A was determined by subtracting the weight of the separator substrate specimen A' from the weight of the separator specimen A.

Next, the separator specimen A was placed in a Teflon® beaker, and sulfuric acid and nitric acid (sulfuric acid:nitric acid=0.1:2 (volume ratio)) were added thereto. The contents of the beaker were heated using a hot plate and were concentrated until carbonization of the separator specimen A occurred. Thereafter, sulfuric acid and nitric acid (nitric acid:nitric acid=0.1:2 (volume ratio)) were added to the beaker and the contents thereof were further concentrated. Nitric acid and perchloric acid (nitric acid:perchloric acid=2:0.2 (volume ratio)) were added to the beaker, followed by further perchloric acid, and the contents of the beaker were concentrated until white smoke was given off. Next, nitric acid and ultrapure water (nitric acid:ultrapure water=1:15 (volume ratio)) were added to the beaker and the contents thereof were heated. The contents of the beaker were left to cool and were then adjusted to a fixed volume to obtain a fixed volume solution A. The amount of cobalt in the fixed volume solution A was measured using an ICP mass spectrometer (ELAN DRS II produced by PerkinElmer Inc.). The cobalt concentration (mass ppm) in the porous membrane prior to the high-temperature cycle test was determined by dividing the amount of cobalt in the fixed volume solution A by the weight of the porous membrane. Note that the amount of cobalt in the separator substrate that was used was negligible.

<<Cobalt Concentration in Porous Membrane after Completion of High-Temperature Cycle Test>>

A separator was removed from a laminate cell after the laminate cell had been subjected to the high-temperature cycle test described below (i.e., after evaluation of high-temperature cycle characteristics) and was cut out to a size of 3.5 cm×4.5 cm to prepare a separator specimen B. The separator specimen B was sufficiently washed with diethyl carbonate and then diethyl carbonate attached to the surface of the specimen was sufficiently wiped off. Next, a fixed volume solution B was obtained from the specimen B and the amount of cobalt in the fixed volume solution B was measured in the same way as for determination of the cobalt concentration in the porous membrane prior to the high-temperature cycle test. The cobalt concentration (mass ppm) in the porous membrane after completion of the high-temperature cycle test was determined by dividing the amount of cobalt in the fixed volume solution B by the weight of the porous membrane. Note that the amount of cobalt in the separator substrate after the high-temperature cycle test was negligible.

<High-Temperature Cycle Characteristics of Lithium Ion Secondary Battery>

Five produced laminate cells having a discharge capacity of 45 mAh were subjected to a test (high-temperature cycle test) in which 200 cycles of charging to 4.35 V and discharging to 3 V were carried out by a 0.5 C constant-current method at an ambient temperature of 45° C. In the test, the discharge capacity C0 after 3 cycles of charging and discharging and the discharge capacity C1 after 200 cycles of charging and discharging (i.e., after completion of the high-temperature cycle test) were measured. An average value for the five cells was taken to be the measured value. The discharge capacity C1 after completion of 200 cycles was converted to a percentage relative to the discharge capacity C0 after completion of 3 cycles (=C1/C0×100%) to determine a discharge capacity retention rate ΔC, which was evaluated by the following standard. A higher discharge capacity retention rate ΔC indicates better high-temperature cycle characteristics.

A: Discharge capacity retention rate ΔC of at least 90%

B: Discharge capacity retention rate ΔC of at least 85% and less than 90%

C: Discharge capacity retention rate ΔC of at least 80% and less than 85%

<Rate Characteristics of Lithium Ion Secondary Battery>

A produced laminate cell having a discharge capacity of 45 mAh was subjected to a charge/discharge cycle in which the laminate cell was charged to 4.35 V with a 0.2 C constant current and discharged to 3.0 V with a 0.2 C constant current at an ambient temperature of 25° C. and a charge/discharge cycle in which the laminate cell was charged to 4.35 V with a 0.2 C constant current and discharged to 3.0 V with a 1.0 C constant current at an ambient temperature of 25° C. The discharge capacity at 1.0 C was converted to a percentage relative to the discharge capacity at 0.2 C (=(discharge capacity at 1.0 C)/(discharge capacity at 0.2 C)×100%) to determine a rate of capacity change ΔC', which was evaluated by the following standard. A larger rate of capacity change ΔC' indicates better rate characteristics.

A: Rate of capacity change ΔC' of at least 80%
B: Rate of capacity change ΔC' of at least 75% and less than 80%
C: Rate of capacity change ΔC' of at least 70% and less than 75%

<Expansion Resistance of Lithium Ion Secondary Battery>

A produced laminate cell having a discharge capacity of 45 mAh was left for 24 hours at an ambient temperature of 25° C. Thereafter, a charge/discharge operation was carried out at an ambient temperature of 25° C. in which the laminate cell was charged to 4.35 V at 0.5 C and discharged to 3.00 V at 0.1 C. The relative density (V0) of the laminate cell was subsequently measured using an automatic densimeter (DSG-1) produced by Toyo Seiki Co., Ltd. A further 200 cycles of the charge/discharge operation were carried out at an ambient temperature of 45° C. with the same conditions. The relative density (V1) of the laminate cell was subsequently measured by the same method as described above. The volume change per unit mass of the laminate cell ΔV=(V1−V0)/V0×100(%) was calculated and was evaluated by the following standard. A smaller volume change ΔV indicates a smaller amount of gas production and better expansion resistance.

A: Volume change ΔV of less than 10%
B: Volume change ΔV of at least 10% and less than 12%
C: Volume change ΔV of at least 12% and less than 14%

Example 1

<Production of Particulate Polymer>

A 5 MPa pressure vessel equipped with a stirrer was charged with 99 parts of 1,3-butadiene as an aliphatic conjugated diene monomer, 1 part of methacrylic acid as an acid group-containing monomer, 0.3 parts of disproportionated potassium rosinate as an emulsifier, 0.2 parts of dodecyl mercaptan, 60 parts of deionized water, 0.5 parts of potassium carbonate as an inorganic electrolyte, and 0.3 parts of potassium persulfate as a polymerization initiator. The contents of the pressure vessel were sufficiently stirred and were then heated to 60° C. to initiate polymerization. Once 55 hours had passed from initiation of polymerization, the reaction was terminated by cooling at the point at which monomer consumption had reached 97.0% to yield an aqueous dispersion containing a particulate polymer.

The microstructure, transition metal capturing ability, degree of swelling in electrolysis solution, and volume average particle diameter D50 of the resultant particulate polymer were measured. The results are shown in Table 1.

<Production of Slurry Composition for Porous Membrane>

Water was added to 100 parts of barium sulfate (volume average particle diameter D50: 0.55 μm, specific surface area: 5.5 g/m$^2$) as non-conductive particles and 0.5 parts of a polycarboxylic acid ammonium salt as a dispersant such that the solid content concentration was 50 mass %, and the barium sulfate was dispersed using a media-less disperser. Thereafter, a polyacrylamide aqueous solution having a solid content concentration of 15 mass % (dissolved upon addition) was added as a viscosity modifier such that the solid content concentration was adjusted to 1.5 mass % and stirring was carried out. Next, 5 parts of the particulate polymer described above and 0.2 parts of a wetting agent were added and water was mixed in to adjust the solid content concentration to 40 mass % and yield a slurry composition for a porous membrane.

The slurry stability of the resultant slurry composition for a porous membrane was evaluated. The results are shown in Table 1.

<Production of Separator>

The slurry composition for a porous membrane described above was applied onto a single-layered polyethylene separator substrate of 250 mm in width, 1,000 m in length, and 12 μm in thickness that had been produced by a wet method. The slurry composition for a porous membrane was applied using a gravure coater at a speed of 20 m/minute such as to have a thickness after drying of 2.0 μm. The applied slurry was then dried in a 50° C. drying furnace to produce porous membrane-containing separator that was then wound up. The content of the particulate polymer per unit area of the produced separator was 0.18 g/m$^2$.

The lithium ion permeability and heat contraction resistance of the obtained separator were evaluated. The results are shown in Table 1.

<Production of Positive Electrode>

A slurry composition for a positive electrode was produced by mixing 100 parts of LiCoO$_2$ (volume average particle diameter D50: 12 μm) as a positive electrode active material, 2 parts of acetylene black (HS-100 produced by Denki Kagaku Kogyo Kabushiki Kaisha), and 2 parts by solid content equivalents of polyvinylidene fluoride (#7208 produced by Kureha Corporation) as a binding material for a positive electrode mixed material layer in N-methylpyrrolidone such that the total solid content concentration was 70%, and then performing further mixing using a planetary mixer. A comma coater was used to apply the resultant slurry composition for a positive electrode onto aluminum foil of 20 μm in thickness, used as a current collector, such as to have a thickness of approximately 150 μm after drying. The slurry composition for a positive electrode was then dried by conveying the aluminum foil inside of a 60° C. oven for 2 minutes at a speed of 0.5 m/minute. The resultant positive electrode web was subsequently rolled by roll pressing to obtain a positive electrode having a positive electrode mixed material layer of 95 μm in thickness.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. The contents of the pressure vessel were sufficiently stirred and were subsequently heated to 50° C. to initiate polymerization. The reaction was terminated by cooling at the point at which the polymerization conversion rate reached 96% to yield a mixture that contained a binding material for a negative electrode mixed material layer (styrene-butadiene copolymer (SBR)). The mixture containing the binding material for a negative electrode mixed material layer was adjusted to pH 8 through addition of 5% sodium hydroxide aqueous solution and unreacted monomers were removed therefrom by heated vacuum distillation. Thereafter, the mixture was cooled to 30° C. or lower to obtain an aqueous dispersion containing the target binding material for a negative electrode mixed material layer.

Next, 100 parts of artificial graphite (volume average particle diameter D50: 15.6 μm) as a negative electrode active material, 1 part by solid content equivalents of a 2% aqueous solution of a sodium salt of carboxymethyl cellulose (MAC350HC produced by Nippon Paper Industries Co., Ltd.) as a thickener, and deionized water were mixed and, after the solid content concentration had been adjusted to 68%, mixing was carried out for 60 minutes at 25° C. The solid content concentration was then adjusted to 62% with deionized water and a further 15 minutes of mixing was carried out at 25° C. Next, 1.5 parts by solid content equivalents of the binding material for a negative electrode mixed material layer described above (SBR) and deionized water were added to the mixed liquid described above and, after the final solid content concentration had been adjusted to 52%, stirring was carried out for a further 10 minutes. The resultant mixture was subjected to a defoaming process under reduced pressure to yield a slurry composition for a negative electrode having good fluidity.

A comma coater was used to apply the resultant slurry composition for a negative electrode onto copper foil of 20 μm in thickness, used as a current collector, such as to have a thickness of approximately 150 μm after drying. The slurry composition for a negative electrode was then dried by conveying the copper foil inside of a 60° C. oven for 2 minutes at a speed of 0.5 m/minute. The resultant negative electrode web was subsequently rolled by roll pressing to obtain a negative electrode including a negative electrode mixed material layer of 100 μm in thickness.

<Production of Lithium Ion Secondary Battery>

An aluminum packing case was prepared as a battery case. The positive electrode obtained as described above was cut such that the current collector was 1.5 cm×3.8 cm in size and the positive electrode mixed material layer was 2.8 cm×3.8 cm in size, and was positioned with a surface at the current collector side thereof in contact with the aluminum packing case. The separator obtained as described above was cut out to 3.5 cm×4.5 cm in size and was positioned on the surface of the positive electrode mixed material layer such that the porous membrane of the separator faced toward the positive electrode. The negative electrode obtained after pressing as described above was cut out such that the current collector was 1.5 cm×4.0 cm in size and the negative electrode mixed material layer was 3.0 cm×4.0 cm in size, and was positioned on the separator such that a surface at the negative electrode mixed material layer side thereof faced toward the separator. The aluminum packing case was filled with an electrolysis solution (solvent: ethylene carbonate (EC)/ethyl methyl carbonate (EMC)/vinylene carbonate (VC)=68.5/30/1.5 (volume ratio), supporting electrolyte: $LiPF_6$ of 1M in concentration) such that no air remained. The aluminum packing case was then closed by heat sealing at 150° C. to tightly seal an opening of the aluminum packing. In this manner, a lithium ion secondary battery was produced in the form of a laminate cell having a discharge capacity of 45 mAh. The amount of the particulate polymer per 100 parts by mass of the negative electrode active material in the lithium ion secondary battery was 0.1 parts by mass.

The high-temperature cycle characteristics, rate characteristics, and expansion resistance of the resultant lithium ion secondary battery, and the maximum cobalt capture amount of the porous membrane therein were measured and evaluated. The results are shown in Table 1.

Example 2

A particulate polymer, a slurry composition for a porous membrane, a separator, a positive electrode, a negative electrode, and a lithium ion secondary battery were produced in the same way as in Example 1 with the exception that in production of the particulate polymer, potassium carbonate was not used as an inorganic electrolyte and the amount of deionized water was changed from 60 parts to 100 parts. Each evaluation was performed in the same way as in Example 1. The results are shown in Table 1. The amount of the particulate polymer per 100 parts by mass of the negative electrode active material in the lithium ion secondary battery was 0.1 parts by mass.

Example 3

A particulate polymer, a slurry composition for a porous membrane, a separator, a positive electrode, a negative electrode, and a lithium ion secondary battery were produced in the same way as in Example 1 with the exception that in production of the particulate polymer, the amount of potassium carbonate that was used as an inorganic electrolyte was changed from 0.5 parts to 0.15 parts. Each evaluation was performed in the same way as in Example 1. The results are shown in Table 1. The amount of the particulate polymer per 100 parts by mass of the negative electrode active material in the lithium ion secondary battery was 0.1 parts by mass.

Example 4

A particulate polymer, a slurry composition for a porous membrane, a separator, a positive electrode, a negative electrode, and a lithium ion secondary battery were produced in the same way as in Example 1 with the exception that in production of the particulate polymer, the amount of potassium carbonate that was used as an inorganic electrolyte was changed from 0.5 parts to 0.07 parts. Each evaluation was performed in the same way as in Example 1. The results are shown in Table 1. The amount of the particulate polymer per 100 parts by mass of the negative electrode active material in the lithium ion secondary battery was 0.1 parts by mass.

Example 5

A particulate polymer, a slurry composition for a porous membrane, a separator, a positive electrode, a negative electrode, and a lithium ion secondary battery were produced in the same way as in Example 1 with the exception that in production of the particulate polymer, the amount of 1,3-butadiene used as an aliphatic conjugated diene monomer was 100 parts and methacrylic acid was not used as an acid group-containing monomer (i.e., the amount thereof was 0 parts). Each evaluation was performed in the same way as in Example 1. The results are shown in Table 1. The amount of the particulate polymer per 100 parts by mass of the negative electrode active material in the lithium ion secondary battery was 0.1 parts by mass.

Example 6

A particulate polymer, a slurry composition for a porous membrane, a separator, a positive electrode, a negative electrode, and a lithium ion secondary battery were produced in the same way as in Example 1 with the exception that in production of the particulate polymer, the amount of 1,3-butadiene used as an aliphatic conjugated diene monomer and the amount of methacrylic acid used as an acid group-containing monomer were as shown in Table 1. Each evaluation was performed in the same way as in Example 1. The results are shown in Table 1. The amount of the particulate polymer per 100 parts by mass of the negative electrode active material in the lithium ion secondary battery was 0.1 parts by mass.

Example 7

A particulate polymer, a slurry composition for a porous membrane, a separator, a positive electrode, a negative electrode, and a lithium ion secondary battery were produced in the same way as in Example 1 with the exception that in production of the particulate polymer, the polymerization temperature was as shown in Table 1. Each evaluation was performed in the same way as in Example 1. The results are shown in Table 1. The amount of the particulate polymer per 100 parts by mass of the negative electrode active material in the lithium ion secondary battery was 0.1 parts by mass.

Examples 8-10

In each example, a particulate polymer, a slurry composition for a porous membrane, a separator, a positive electrode, a negative electrode, and a lithium ion secondary battery were produced in the same way as in Example 1 with the exception that in production of the slurry composition for a porous membrane, the amount of the particulate polymer compounded relative to 100 parts of barium sulfate used as non-conductive particles was as shown in Table 1. Each evaluation was performed in the same way as in Example 1. The results are shown in Table 1. The amount of the particulate polymer relative to 100 parts by mass of the negative electrode active material in the lithium ion secondary battery was 0.06 parts by mass, 0.2 parts by mass, and 0.28 parts by mass in Examples 8-10, respectively.

Comparative Example 1

A slurry composition for a porous membrane, a separator, a positive electrode, a negative electrode, and a lithium ion secondary battery were produced in the same way as in Example 1 with the exception that a particulate polymer produced as described below was used. With the exception of the microstructure of the particulate polymer, each evaluation was performed in the same way as in Example 1. The results are shown in Table 1. The amount of the particulate polymer per 100 parts by mass of the negative electrode active material in the lithium ion secondary battery was 0.1 parts by mass.

<Production of Particulate Polymer>

A reaction vessel equipped with a stirrer was charged with 70 parts of deionized water, 0.15 parts of sodium lauryl sulfate (product name: EMAL® 2F (EMAL is a registered trademark in Japan, other countries, or both), produced by Kao Corporation) as an emulsifier, and 0.5 parts of ammonium peroxodisulfate as a polymerization initiator. The gas phase in the reaction vessel was purged with nitrogen gas and the contents of the reaction vessel were heated to 60° C.

A monomer mixture was prepared in a separate container by mixing 50 parts of deionized water, 0.5 parts of sodium dodecylbenzenesulfonate as a dispersant, 94.8 parts of n-butyl acrylate, 1 part of methacrylic acid, 1.2 parts of N-methylolacrylamide, 2 parts of acrylonitrile, and 1 part of allyl glycidyl ether. The monomer mixture was continuously added to the reaction vessel over 4 hours while carrying out polymerization. A reaction was carried out at 60° C. during the addition. After the addition was complete, stirring was carried out for a further 3 hours at 70° C. to complete the reaction and yield an aqueous dispersion containing a particulate polymer.

The transition metal capturing ability, degree of swelling in electrolysis solution, and volume average particle diameter D50 of the resultant particulate polymer were measured. The results are shown in Table 1. The resultant particulate polymer had a glass transition temperature of −45° C.

Comparative Example 2

A particulate polymer, a slurry composition for a porous membrane, a separator, a positive electrode, a negative electrode, and a lithium ion secondary battery were produced in the same way as in Example 1 with the exception that in production of the particulate polymer, instead of using 99 parts of 1,3-butadiene as an aliphatic conjugated diene monomer, 65 parts of 1,3-butadiene was used as an aliphatic conjugated diene monomer and 34 parts of styrene was used as an aromatic vinyl monomer. Each evaluation was performed in the same way as in Example 1. The results are shown in Table 1. The amount of the particulate polymer per 100 parts by mass of the negative electrode active material in the lithium ion secondary battery was 0.1 parts by mass.

TABLE 1

| | | | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|---|
| Porous membrane | Non-conductive particles | Type | Barium sulfate | Barium sulfate | Barium sulfate | Barium sulfate | Barium sulfate | Barium sulfate | Barium sulfate | Barium sulfate | Barium sulfate | Barium sulfate | Barium sulfate | Barium sulfate |
| | | Specific surface area [m²/g] | 5.5 | 5.5 | 5.5 | 5.5 | 5.5 | 5.5 | 5.5 | 5.5 | 5.5 | 5.5 | 5.5 | 5.5 |
| | | Volume average particle diameter D50 [μm] | 0.55 | 0.55 | 0.55 | 0.55 | 0.55 | 0.55 | 0.55 | 0.55 | 0.55 | 0.55 | 0.55 | 0.55 |
| | Particulate polymer | Composition 1,3-Butadiene [parts by mass] | 99 | 99 | 99 | 99 | 100 | 86 | 99 | 99 | 99 | 99 | 0 | 65 |
| | | Styrene [parts by mass] | — | — | — | — | — | — | — | — | — | — | — | 34 |
| | | Methacrylic acid [parts by mass] | 1 | 1 | 1 | 1 | — | 14 | 1 | 1 | 1 | 1 | — | 1 |
| | | Acrylic acid [parts by mass] | — | — | — | — | — | — | — | — | — | — | 94.8 | — |
| | | n-Butyl acrylate [parts by mass] | — | — | — | — | — | — | — | — | — | — | 2 | — |
| | | Acrylonitrile [parts by mass] | — | — | — | — | — | — | — | — | — | — | 1 | — |
| | | Allyl glycidyl ether [parts by mass] | — | — | — | — | — | — | — | — | — | — | — | — |
| | | N-Methylolacrylamide [parts by mass] | — | — | — | — | — | — | — | — | — | — | 1.2 | — |
| | | Polymerization temperature [°C] | 60 | 60 | 60 | 60 | 60 | 60 | 5 | 60 | 60 | 60 | 60 | 60 |
| | | Proportion of trans-1,4 bonding in 1,3-butadiene unit [mol %] | 59 | 59 | 58 | 59 | 60 | 58 | 71 | 59 | 59 | 59 | — | 63 |
| | | Proportion of cis-1,4 bonding in 1,3-butadiene unit [mol %] | 23 | 23 | 24 | 23 | 24 | 22 | 13 | 23 | 23 | 23 | — | 23 |
| | | Proportion of 1,2 bonding in 1,3-butadiene unit [mol %] | 18 | 18 | 18 | 18 | 16 | 20 | 16 | 18 | 18 | 18 | — | 14 |
| | | Volume average particle diameter D50 [nm] | 360 | 100 | 260 | 450 | 370 | 370 | 360 | 360 | 360 | 360 | 150 | 120 |
| | | Transition metal capturing ability [mass ppm] | 497 | 550 | 513 | 450 | 470 | 350 | 530 | 497 | 497 | 497 | 150 | 250 |
| | | Degree of swelling in electrolysis solution (factor) | 1.5 | 1.5 | 1.5 | 1.5 | 1.5 | 1.3 | 1.5 | 1.5 | 1.5 | 1.5 | 3.7 | 1.7 |
| | | Amount [parts by mass/100 parts by mass of non-conductive particles] | 5 | 5 | 5 | 5 | 5 | 5 | 5 | 3 | 10 | 15 | 5 | 5 |
| Evaluation | Slurry composition for porous membrane | Thickness [μm] | 2 | 2 | 2 | 2 | 2 | 2 | 2 | 2 | 2 | 2 | 2 | 2 |
| | | Particulate polymer content [g/m²] | 0.18 | 0.18 | 0.18 | 0.18 | 0.18 | 0.18 | 0.18 | 0.11 | 0.35 | 0.78 | 0.18 | 0.18 |
| | | Slurry stability | A | B | A | A | B | A | A | A | A | B | B | A |
| | Separator | Lithium ion permeability | A | C | A | A | A | A | A | A | B | B | C | C |
| | | Heat contraction resistance | A | A | A | B | B | A | A | A | B | B | A | A |
| | | Maximum cobalt capture amount of porous membrane [mass ppm] | 991 | 1097 | 1023 | 897 | 937 | 698 | 1057 | 595 | 1503 | 1755 | 5 | 498 |
| | Lithium ion secondary battery | High-temperature cycle characteristics | A | B | A | A | B | A | A | B | A | B | C | B |
| | | Rate characteristics | A | C | A | A | A | A | A | A | B | B | C | C |
| | | Expansion resistance | A | B | A | A | A | B | A | B | A | B | C | B |

It can be seen from Table 1 that in the case of Examples 1-10 in which a porous membrane was used that contained a particulate polymer including an aliphatic conjugated diene monomer unit in a proportion of greater than 85 mass % and no greater than 100 mass % and having a transition metal capturing ability of at least 300 mass ppm, the porous membrane had excellent capturing ability with respect to transition metal ions since the maximum cobalt capture amount thereof was high, and it was possible to obtain a secondary battery having good life characteristics.

Moreover, it can be seen from Table 1 that in the case of Comparative Example 1 in which a porous membrane was used that contained a particulate polymer that did not include an aliphatic conjugated diene monomer unit and that had a transition metal capturing ability of less than 300 mass ppm, the maximum cobalt capture amount of the porous membrane was remarkably low and porous membrane was not able to capture hardly any of a constituent transition metal of the positive electrode active material. As a result, it was not possible to obtain a secondary battery having good life characteristics.

Examples 1-4 in Table 1 demonstrate that it is possible to achieve a balance of high levels of lithium ion permeability, transition metal ion capturing ability, and heat contraction resistance for the porous membrane and life characteristics for the secondary battery by adjusting the volume average particle diameter D50 of the particulate polymer.

Moreover, Examples 1, 5, and 6 in Table 1 demonstrate that it is possible to improve stability of the slurry composition and to provide the porous membrane with good heat contraction resistance and the secondary battery with good battery characteristics by using a particulate polymer including an acid group-containing monomer in a specific proportion.

Furthermore, Examples 1 and 8-10 in Table 1 demonstrate that it is possible to provide the porous membrane with good lithium ion permeability and the secondary battery with good battery characteristics by setting the amount of the particulate polymer in a specific range.

INDUSTRIAL APPLICABILITY

According to the present disclosure, it is possible to provide a porous membrane for a lithium ion secondary battery having excellent capturing ability with respect to transition metal ions originating from a positive electrode active material. Moreover, according to the present disclosure, it is possible to provide a lithium ion secondary battery having excellent life characteristics such as expansion resistance and cycle characteristics.

The invention claimed is:

1. A porous membrane for a lithium ion secondary battery comprising non-conductive particles and a particulate polymer, wherein
   the particulate polymer includes an aliphatic conjugated diene monomer unit in a proportion of greater than 85 mass %,
   a degree of swelling in electrolysis solution of the particulate polymer is greater than a factor of 1 and no greater than a factor of 2.5, and
   a cobalt concentration in a film of 500 μm in thickness and 12 mm in diameter, formed from the particulate polymer, after the film is immersed in a cobalt chloride ($CoCl_2$) solution for 5 days at 25° C. is at least 300 mass ppm, where the cobalt chloride ($CoCl_2$) solution is defined as a solution having a cobalt concentration of 18 mass ppm in which a mixture of ethyl methyl carbonate and ethylene carbonate with an ethyl methyl carbonate:ethylene carbonate mass ratio of 70:30 is used as a solvent.

2. The porous membrane for a lithium ion secondary battery of claim 1, wherein
   the particulate polymer includes an acid group-containing monomer unit in a proportion of at least 0.1 mass % and less than 15 mass %.

3. The porous membrane for a lithium ion secondary battery of claim 1, wherein
   a proportion of trans-1,4 bonding in the aliphatic conjugated diene monomer unit of the particulate polymer is at least 50 mol % and no greater than 80 mol %.

4. The porous membrane for a lithium ion secondary battery of claim 1, wherein
   the particulate polymer has a volume average particle diameter D50 of at least 250 nm and no greater than 400 nm.

5. The porous membrane for a lithium ion secondary battery of claim 1, having a maximum cobalt capture amount of at least 500 mass ppm and no greater than 3,000 mass ppm.

6. A lithium ion secondary battery comprising:
   a positive electrode mixed material layer including a transition metal-containing positive electrode active material; and
   the porous membrane for a lithium ion secondary battery of claim 1.

7. The lithium ion secondary battery of claim 6, wherein
   the particulate polymer is contained in a proportion of at least 0.05 parts by mass and no greater than 2 parts by mass relative to 100 parts by mass of the positive electrode active material.

* * * * *